United States Patent [19]

Malks

[11] Patent Number: 5,186,591

[45] Date of Patent: Feb. 16, 1993

[54] TEMPORARY SUPPORT PIN

[76] Inventor: Josh B. Malks, 1802 Frobisher Way, San Jose, Calif. 95124

[21] Appl. No.: 687,967

[22] Filed: Apr. 19, 1991

[51] Int. Cl.⁵ .............................................. F16B 19/00
[52] U.S. Cl. .................................... 411/508; 411/301; 411/306; 411/392; 411/424
[58] Field of Search ............... 411/508, 913, 392, 424, 411/339, 301, 305, 306, 947, 447, 324, 166, 378, 337

[56] References Cited

U.S. PATENT DOCUMENTS

| | | | |
|---|---|---|---|
| 1,426,237 | 8/1922 | Witzberger | 411/392 |
| 1,921,379 | 8/1933 | Bailey | 29/271 X |
| 2,374,740 | 5/1945 | Gadow | 411/366 |
| 2,407,160 | 9/1946 | Kahn | 411/301 |
| 2,826,807 | 3/1958 | Harris | 411/378 X |
| 2,991,695 | 7/1961 | Jones | 411/306 X |
| 3,148,433 | 9/1964 | Carriker | 411/508 X |
| 3,393,431 | 7/1968 | Saunders | 411/508 |
| 3,574,899 | 4/1971 | Fisher | 24/73 |
| 3,752,032 | 8/1973 | Fiddler | 85/80 |
| 3,775,927 | 12/1973 | Meyer | 52/718 |
| 3,777,052 | 12/1973 | Fegen | 174/138 |
| 3,811,154 | 5/1974 | Lindeman et al. | 411/508 X |
| 3,860,999 | 1/1975 | Meyer | 411/508 X |
| 3,905,570 | 9/1975 | Nieuwveld | 248/71 |
| 4,630,983 | 12/1986 | Fischer | 411/508 X |
| 4,787,795 | 11/1988 | Kraus | 411/510 |
| 4,973,212 | 11/1990 | Jacobs | 411/508 |
| 5,035,154 | 7/1991 | Jonischus | 411/508 X |

FOREIGN PATENT DOCUMENTS

| | | | |
|---|---|---|---|
| 2201058 | 7/1973 | Fed. Rep. of Germany | 411/508 |
| 736058 | 11/1932 | France | 411/392 |

Primary Examiner—Rodney M. Lindsey
Attorney, Agent, or Firm—Rosenblum, Parish & Isaacs

[57] ABSTRACT

An improved temporary support pin which may be pushed into place rather than screwed into place and used with either English or metric threads. Resilient arms protruding from the support pin are depressed when a workpiece is pushed over them, and spring back into place to support the workpiece and allow a mechanic to have both hands free for replacing screws which attach the workpiece to its permanent mounting. The embodiment further includes a non-circular cross-section at the end gripped by the mechanic, to permit easy gripping, insertion, turning, and removal of the pin. The improved pin is preferably manufactured in one-step molding, significantly reducing the cost of its manufacture.

6 Claims, 3 Drawing Sheets

TEMPORARY SUPPORT PIN

BACKGROUND OF THE INVENTION

1. Field of the Invention

The present invention relates generally to temporary support means for a workpiece while the workpiece is being permanently mounted to a body, and more particularly to an improved support pin which permits a mechanic to mount a workpiece temporarily in order to free both hands for inserting the permanent mounting screws for the workpiece. One specific application of the pin is in the temporary mounting of a vehicle oil pan.

2. Brief Description of the Prior Art

A number of specialized resilient fastening and support devices have been developed over the years to simplify the installation or connection of various workpieces. These devices typically include resilient means which permit the fastening or support device to be inserted into a workpiece or into the body to which the workpiece is to be attached. The device is usually deformed in some manner while the insertion is performed, and after insertion the device recovers it initial configuration. This return to the initial configuration enables the workpiece to be fastened or supported.

For example, Kraus (L.S. Pat. No. 4,787,795) teaches a bolt-shaped push in fastener with resilient arms. As the fastener is inserted the arms are compressed, which allows the fastener to pass through an aperture. The arms have notches to engage the workpiece opening upon insertion of the fastener. Meyer (U.S. Pat. No. 3,775,927) discloses a similar selfretaining fastener. Nieuwveld (U.S. Pat. No. 3,905,570) shows a fastening device having an article-retaining head portion and a plurality of parallel resilient legs projecting from the head. The legs have a series of protrusions which grip the aperture into which the legs are inserted. Fiddler (U.S. Pat. No. 3,752,032) and Fisher (U.S. Pat. No. 3,574,899) both teach fasteners which may be fixed in an aperture, with a screw mounted within the fastener. Fegen (U.S. Pat. No. 3,777,052) discloses a support for detachably securing a circuit board to a chassis. The support device features resilient arms which may be deformed as they are pushed through an aperture, whereupon the arms regain their shapes and grip the workpiece.

Oil pan support pins are known in the prior art. These support pins simplify the installation of oil pans on automobiles, trucks, and industrial equipment. The support pins are used to support an oil pan temporarily while it is being replaced after engine maintenance or repair. The support pins known in the prior art consist of cylindrical metal pins that are threaded at one end and have a slot for a screwdriver at the opposite end. A single arm of spring steel is attached to the pin toward the end of the pin having the slot. The arm protrudes at an angle away from the support pin. After several support pins are inserted into the screw holes in the engine block which normally hold the cap screws that secure the oil pan to the block, the oil pan with gasket on top may be pushed up over the support pins and protruding arms. The protruding arm on each pin depresses easily as the pan passes over, then springs back into its normal extended position. The oil pan is now held in place below the block, and the mechanic has both hands free to install the securing cap screws and lock washers. Typical engines use between twelve and twenty of these cap screws. After the cap screws are inserted into the screw holes not occupied by support pins, the mechanic unscrews the support pins and replaces them with the remaining cap screws and lock washers.

The prior art oil pan support pins have several disadvantages. Since the pins are threaded for either English or metric threads, a mechanic must have different pins to use on vehicles having each type of thread. The prior art support pins must be inserted by threading them into place; often this requires use of a screwdriver because the threads on the engine block are not clean enough to permit hand-threading. Moreover, the prior art support pins are cylindrical. Thus, when the pins become oily (a common occurrence when oil pans are removed and replaced), the pins are difficult to grip and turn by hand. In addition, the prior art pins use only one protrusion each to support the oil pan. This increases the likelihood of failure of a pin with the result that the oil pan is not securely held in place. The prior art pins are also made of metal. Thus, their manufacture requires significant and costly machining.

SUMMARY OF THE INVENTION

It is an object of this invention to provide an improved temporary support pin which permits a mechanic to mount a workpiece simply and efficiently by freeing the mechanic's hands while the permanent screws are inserted. It is a further object of this invention to provide a temporary support pin which may be used with either English or metric threads, thus avoiding unnecessary duplication of tools and the accompanying expense.

It is another object of this invention to provide an improved temporary support pin which may be pushed into place rather than screwed into place, while still maintaining a secure temporary mounting for the workpiece, thereby minimizing the time required for temporarily mounting the workpiece and also reducing the likelihood of damage to the threads on the object to which the workpiece is attached. A further object of this invention is to create an improved temporary support pin designed to be pushed into place and automatically stop at the proper depth in the object to which the workpiece is to be attached.

It is still another object of the invention to provide an improved temporary support pin with a non-circular cross-section at the end gripped by the mechanic, thereby allowing the mechanic to grip, turn, insert, and remove the pin easily by hand.

A further object of this invention is to minimize the likelihood of failure of a temporary support pin by ensuring that the workpiece is securely held in place by a plurality of protrusions.

Another object of this invention is to provide a temporary support pin which may be manufactured inexpensively and efficiently, without costly machining or assembly.

These and related objects may be achieved through the use of the preferred embodiment of the improved temporary support pin disclosed below. Briefly, the preferred embodiment of this invention comprises a temporary support pin made of a resilient plastic material capable of securely supporting the weight of the subject workpiece. Use of unitary plastic construction permits manufacture of the support pin in one-step molding, rather than by the machining and assembly required for prior art pins.

The preferred embodiment utilizes a plurality of springy protrusions to insure that the workpiece will be more securely supported. In addition, the end of the support pin that is inserted into the screw holes in the object to which the workpiece is to be attached may have a hollow central chamber. This permits the support pin to be pushed into place by compressing the sides of the device. This feature also permits the same support pin to fit both metric and English screw threads. Moreover, in the preferred embodiment the length of the support pin is such that when the pin is pushed into place it automatically stops at the proper depth. In an alternative embodiment particularly suited to heavier workpieces, English and metric threads are interchangeable.

The preferred embodiment also includes a non-circular cross-section at the end of the pin opposite the threads, a feature which enables the mechanic to grip, turn, insert, and remove the support pin easily without use of a screwdriver and without requiring that the pin or the mechanic's hands be cleaned of oil residue.

The attainment of the foregoing and related objects, advantages and features of the invention should be more readily apparent to those skilled in the art after review of the following more detailed description of the invention.

DETAILED DESCRIPTION OF THE PREFERRED EMBODIMENT

Figure 1:
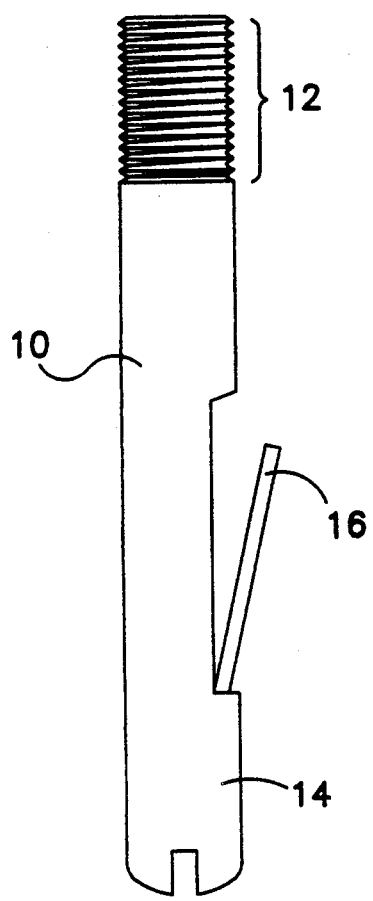
FIG. 1 is a plan view of a prior art oil pan support pin.

This invention constitutes an improved support pin for temporary support of a workpiece while the workpiece is being permanently mounted. The invention is described below with specific reference to its use as an oil pan support pin. However, it is suited to use in any number of different applications where a workpiece must be temporarily mounted. With reference to FIG. 1, an oil pan support pin as known in the prior art is illustrated. The support pin 10 includes a threaded end 12, slotted end 14 located opposite threaded end 12, and protruding arm 16. Support pin 10 and protruding arm 16 are metal, with protruding arm 16 composed of a resilient metal such as spring steel. Threaded end 12 is machined into its form, which permits threaded end 12 to be threaded into a screw hole in an engine block which normally holds a cap screw used to secure an oil pan to the engine block. Similarly, slotted end 14 is machined to allow support pin 10 to be turned with a screwdriver during insertion or removal of support pin 10. After several support pins 10 are inserted, the oil pan (with gasket on top) is pushed up over the pins. The protruding arm 16 on each pin 10 depresses easily as the oil pan passes over, then springs back into its normal extended position. The oil pan is now held in place below the engine block, and the mechanic may use both hands to replace the permanent cap screws.

Figure 2A:
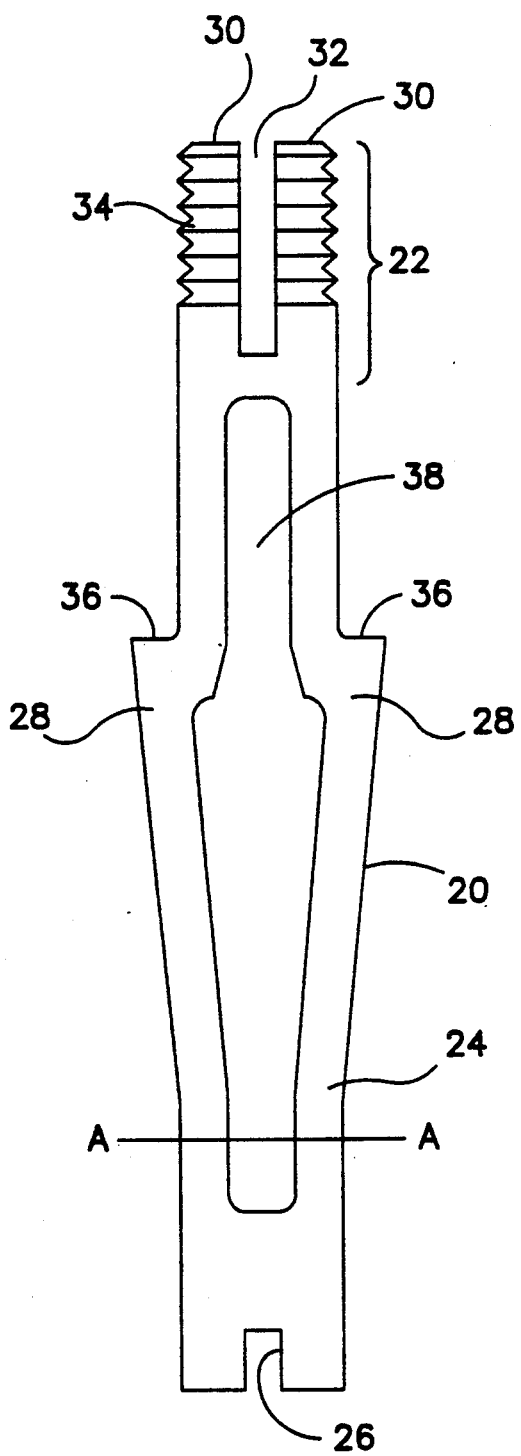
FIG. 2(a) is a plan view of a preferred embodiment of the temporary support pin of this invention.

Referring now to FIG. 2(a), a preferred embodiment of the improved oil pan support pin of this invention is shown. Support pin 20 is composed of a resilient plastic material such as Delrin, a product of DuPont. The support pin 20 is preferably manufactured in one-step molding, thus avoiding the machining and assembly required for prior art pins. Support pin 20 includes a threaded end 22, gripping end 24 with screwdriver slot 26, and a plurality of resilient protruding arms 28.

Support pin 20 may be inserted into an engine block screw hole either by pushing or screwing threaded end 22 into the engine block screw hole. In the embodiment shown in FIG. 2, threaded end 22 includes a plurality of resilient legs 30 separated by space 32. When support pin 20 is pushed into an engine block screw hole, legs 30 are compressed inward into space 32, permitting threaded end 22 to enter the screw hole. Since threaded end 22 may be pushed into place, the risk of stripping the threading in the engine block screw hole is reduced. In addition, the support pin 20 may be inserted without a screwdriver, which is often required if the threads on the engine block screw hole are damaged or dirty.

Threaded end 22 preferably has a length such that it automatically stops at the proper depth in the screw hole. In other words, when threaded end 22 has been inserted as far as it will go into the engine block screw hole, support pin 20 is at the proper position for use to support the oil pan to be refitted into permanent position.

Figure 3:
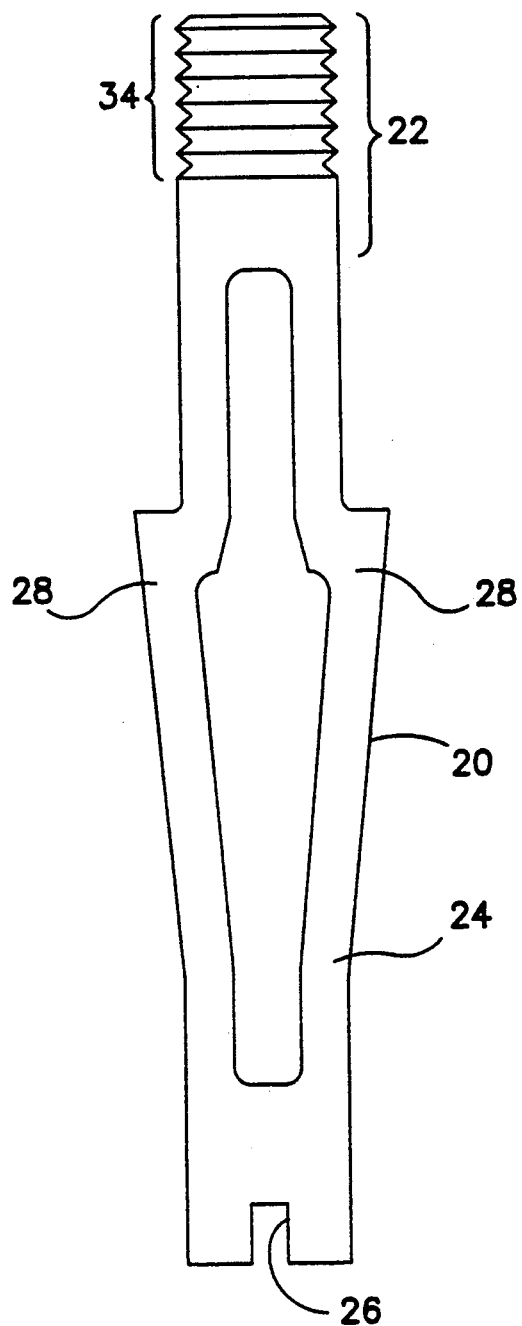
FIG. 3 is a plan view of a variation of the embodiment of the temporary support pin shown in FIG. 2.

After threaded end 22 is pushed into an engine block screw hole, resilient legs 30 press outward against the screw hole, holding support pin 20 in place. The threaded end 22 shown in FIG. 2(a) may have threads 34 designed to grip screw holes having either English or metric threading. Thus, a mechanic need not have sets of support pins 20 for each type of thread. However, in the case of heavier oil pans, it may be necessary to use support pins 20 that have either English or metric threads, in order to ensure a sufficiently strong grip of the threaded end 22 in the screw hole. FIG. 3 shows an alternative embodiment in which the threaded end 22 does not have legs 30 or space 32. Instead, threaded end 22 is solid and has either English or metric threads, so that when support pin 20 is screwed into place, it will securely hold a heavy oil pan.

Referring again to FIG. 2(a), the operation of protruding arms 28 is illustrated. After support pin 20 is inserted into an engine block screw hole, an oil pan is pushed up over the support pin 20. Protruding arms 28 are resilient, depressing easily into hollow central chamber 38 as the oil pan is pushed upward. When the oil pan passes beyond shoulders 36, protruding arms 28 spring back into their normal extended positions and shoulders 36 hold the oil pan in place. In contrast to the prior art, the preferred embodiment of this invention utilizes a plurality of protruding arms 28 with shoulders 36 to ensure that the oil pan is securely held in place.

Figure 2B:
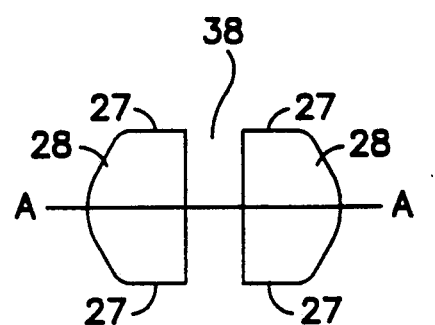
FIG. 2(b) is a cross-section taken along line A—A of FIG. 2(a)
Figure 4:
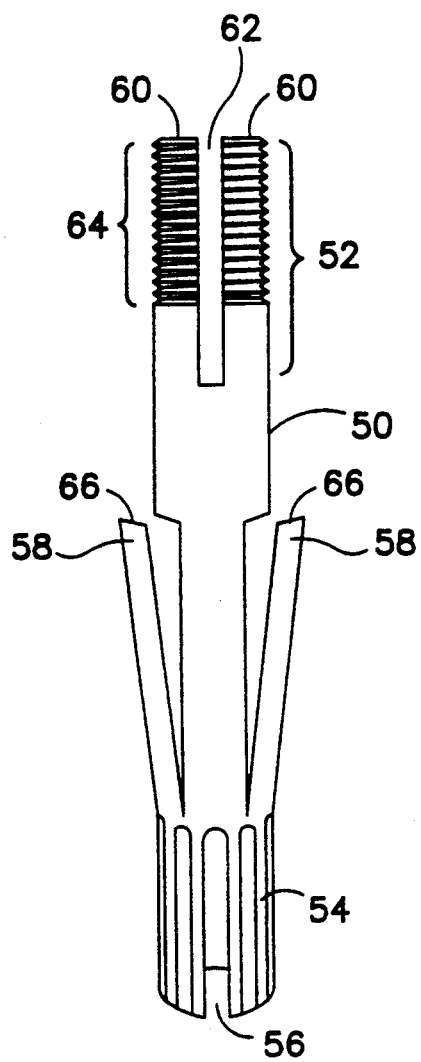
FIG. 4 is a plan view of another embodiment of the improved temporary support pin according to this invention.

The gripping end of the support pin preferably is non-cylindrical. This permits the mechanic to grip support pin securely even if the mechanic's hands or support pin are covered with an oil film. In FIG. 2(b), a cross-section taken along line A—A of FIG. 2(a) shows that arms 28 have flat surfaces 27 to permit easy gripping of support pin 20. The cross-section of the gripping end may be rectangular, ovoid, polygonal, knurled, or any other shape which allows the mechanic to form a firm grip on the gripping end. FIG. 4 shows a knurled gripping end 54. Referring back to FIG. 2(a), gripping end 24 also includes a screwdriver slot 26, which may be used in cases where additional torque is required or remove the support pin 20 into an engine block screw hole or to remove the support pin 20 from such screw hole.

With reference to FIG. 4, an alternative embodiment of the invention is shown. Support pin 50 has threaded end 52 with legs 60, space 62, and threads 64. Support pin 50 is inserted in the same manner as that discussed above in reference to FIG. 2. The opposite end of support pin 50, gripping end 54, is shown as knurled in FIG. 4. As discussed with reference to FIG. 2, this is one of a number of possible configurations of gripping end 54 which will enable a mechanic to more securely grip support pin 50. Gripping end 54 also has screwdriver slot 56, in case extra torque is required. The embodiment shown in FIG. 4 has a different configuration of protruding arms 58. Unlike the embodiment shown in FIG. 2, protruding arms 58 are attached to the main body of support pin 50 only toward gripping end 54, and are not attached to the main body of support pin 50 toward the threaded end 54. However, the operation of support pin 50 is similar to that of support pin 20 shown in FIG. 2(a), with the oil pan pushed up over resilient protruding arms 58 until the oil pan rests upon shoulders 66. As the embodiment shown in FIG. 2(a), the embodiment shown in FIG. 4 has a significant advantage over the prior art in that it may be molded in one step and in one piece, and therefore does not require machining or assembly.

Figure 5:
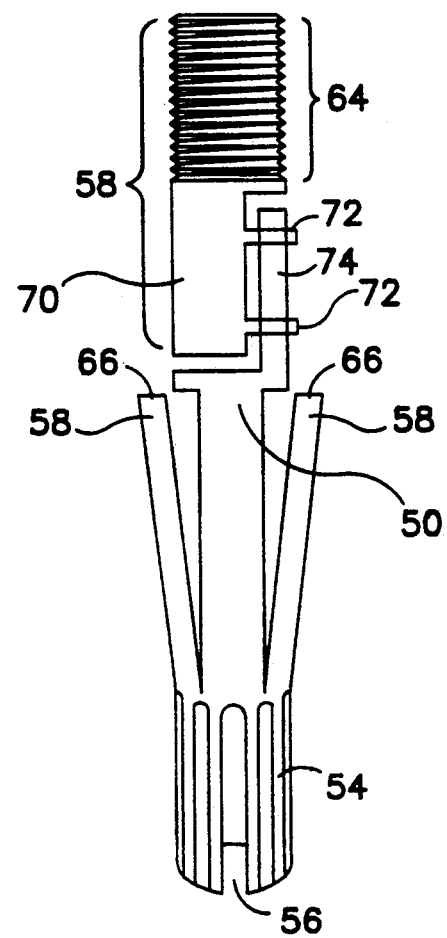
FIG. 5 is a plan view of a variation of the embodiment of the temporary support pin shown in FIG. 4.

Referring now to FIG. 5, an additional feature of the invention is illustrated. As noted in the discussion of FIG. 2, for heavier oil pans it may be necessary to use a support pin having threads that are either metric or English, rather than threads which snap into place to fit either type of threads. FIG. 5 shows support pin 50 with interchangeable threaded end 68. Interchangeable threaded end 68 has stalk 70 with engagement pins 72, which permit interchangeable threaded end 68 to be snapped into place on stem 74 of support pin 50. Thus, support pin 50 may be used with an interchangeable threaded end 68 that has either metric or English threads. A mechanic need only have interchangeable threaded ends of each variety, rather than support pins of each variety. The mechanism shown in FIG. 5 for securing interchangeable threaded end 68 to stem 74 is illustrative. A number of alternative securing methods are known in the prior art and are equally suitable.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A pin for temporarily supporting a workpiece while said workpiece is being permanently mounted to an object, comprising:
   an engaging end for insertion into a preformed aperture of said object, said engaging end having engaging means for removably holding said pin in said preformed aperture;
   a gripping end opposite said engaging end which facilitates manipulation of the pin; and
   an elongated central body between said engaging and gripping ends, said central body including a plurality of resilient protruding arms, said arms connected to and flaring outward from said gripping end toward said engaging end, said arms terminating in shoulders which are substantially perpendicular to the elongated dimension of the pin, at least two of said shoulders further connected to a neck which connects said shoulders to said engaging end of the pin, said arms, shoulders and neck defining a hollow central chamber into which said arms and shoulders can be compressed in a direction transverse to the elongated dimension of said pin, to temporarily reduce the width of said pin;
   whereby after said engaging means have been attached to said preformed aperture of the object, an aperture in said workpiece may be aligned with said pin, thereby permitting said workpiece to be pushed over said resilient protruding arms and shoulders, compressing said arms and shoulders into said hollow central chamber until said workpiece passes over said shoulders, whereupon said arms and shoulders spring back into their uncompressed positions, so that said shoulders support but do not engage said workpiece, and whereby said pin can be removed from said preformed aperture and workpiece by disengagement of said engaging means without recompression of said arms and shoulders.

2. The pin of claim 1, wherein said pin is a unitary molding of a resilient plastic material.

3. The pin of claim 1, wherein said engaging end includes a plurality of resilient legs, forming a hollow space into which said legs may be compressed when said engaging end is inserted into said preformed aperture on said object, thereby allowing said engaging end to be pushed into said preformed aperture, whereupon said resilient legs exert sufficient outward pressure to hold said pin securely in said preformed aperture.

4. The pin of claim 1, wherein said engaging end is of such a length that when said engaging end if fully inserted into said preformed aperture, said shoulders are at the distance from said object appropriate for positioning said workpiece relative to said object.

5. The pin of claim 1, wherein said engaging means are screw threads.

6. The pin of claim 5, wherein said pin is a unitary molding of resilient plastic material.

* * * * *